(12) United States Patent
Gao et al.

(10) Patent No.: US 12,010,059 B2
(45) Date of Patent: *Jun. 11, 2024

(54) METHODS AND APPARATUSES FOR REFERENCE SIGNAL CONFIGURATION

(71) Applicant: NEC Corporation, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,476

(22) Filed: Jan. 27, 2023

(65) Prior Publication Data

US 2023/0171058 A1    Jun. 1, 2023

Related U.S. Application Data

(63) Continuation of application No. 17/186,065, filed on Feb. 26, 2021, now Pat. No. 11,595,171, which is a
(Continued)

(51) Int. Cl.
*H04L 5/00* (2006.01)
*H04W 72/23* (2023.01)
(Continued)

(52) U.S. Cl.
CPC .......... *H04L 5/0048* (2013.01); *H04W 72/23* (2023.01); *H04W 72/0446* (2013.01); *H04W 72/0453* (2013.01)

(58) Field of Classification Search
CPC ............................ H04L 5/0048; H04W 72/23; H04W 72/0446; H04W 72/0453
See application file for complete search history.

(56) References Cited

U.S. PATENT DOCUMENTS

2013/0114535 A1    5/2013  Ng et al.
2013/0242902 A1    9/2013  Liu et al.
(Continued)

FOREIGN PATENT DOCUMENTS

CN    104012153 A    8/2014
CN    104160766 A    11/2014
(Continued)

OTHER PUBLICATIONS

"Text Proposal for CSI-RS for Time/frequency Tracking", OPPO, R1-1802130, 3GPP TSG RAN WG1 Meeting #92, Feb. 26-Mar. 2, 2018, 2 pages, Athens, Greece.
(Continued)

*Primary Examiner* — Melvin C Marcelo
(74) *Attorney, Agent, or Firm* — Sughrue Mion, PLLC

(57) ABSTRACT

Embodiments of the present disclosure relate to methods and apparatuses for Reference Signal (RS) transmission. In example embodiments, a method implemented in a network device is provided. According to the method, the network device determines at least one set of CSI-RS resources for transmitting Tracking Reference Signal (TRS) to a terminal device. The network device further determines a first offset between a first slot to transmit a first signal for enabling transmission of the TRS and a second slot to transmit the TRS in the at least one set of CSI-RS resources. The first offset is different from a second offset between a third slot to transmit a second signal for enabling transmission of CSI-RS and a fourth slot to transmit the CSI-RS. The network device transmits a configuration indicating the at least one set of CSI-RS resources and the first offset to the terminal device.

18 Claims, 4 Drawing Sheets

Related U.S. Application Data continuation of application No. 17/037,208, filed on Sep. 29, 2020, now Pat. No. 11,070,337, which is a continuation of application No. PCT/CN2018/081625, filed on Apr. 2, 2018.

(51) Int. Cl.
*H04W 72/0446* (2023.01)
*H04W 72/0453* (2023.01)

(56) References Cited

U.S. PATENT DOCUMENTS

| | | |
|---|---|---|
| 2014/0314000 A1 | 10/2014 | Liu et al. |
| 2015/0030037 A1 | 1/2015 | Ahn et al. |
| 2015/0117314 A1 | 4/2015 | Gou et al. |
| 2015/0139113 A1 | 5/2015 | You et al. |
| 2017/0135074 A1 | 5/2017 | Yi et al. |
| 2019/0174466 A1 | 6/2019 | Zhang et al. |
| 2019/0335470 A1 | 10/2019 | Si |
| 2020/0296753 A1 | 9/2020 | Nimbalker et al. |
| 2020/0304263 A1 | 9/2020 | Zhang et al. |
| 2020/0396047 A1 | 12/2020 | Gao et al. |

FOREIGN PATENT DOCUMENTS

| | | | |
|---|---|---|---|
| CN | 104756576 | A | 7/2015 |
| CN | 104956611 | A | 9/2015 |
| CN | 107733499 | A | 2/2018 |
| CN | 107733595 | A | 2/2018 |
| JP | 2017-523655 | A | 8/2017 |
| WO | 2013/147532 | A1 | 10/2013 |
| WO | 2014/119888 | A1 | 8/2014 |

OTHER PUBLICATIONS

International Search Report for PCT/CN2018/081625 dated Jan. 4, 2019 (PCT/ISA/210).
Written Opinion for PCT/CN2018/081625 dated Jan. 4, 2019 (PCT/ISA/237).
Nokia: "CR to 38.214 capturing the Jan. 18 ad-hoc and RAN1#92 meeting agreements", 3GPP Draft, Athens, Feb. 26-Mar. 1, 2018, R1-1803555, XP051509058 (79 pages).
Huawei: "Outcome of email discussion [NR-AH1801 #21 ][NR] 38.331 ASN 1 review part 3—L2 params (Huawei)", 3GPP Draft; Athens, Greece, Feb. 26-Mar. 2, 2018, R2-1803881, XP051400953 (245 pages).
The Extended European Search Report dated Feb. 16, 2021, issued by the European Patent Office in application No. 18913370.5.
Qualcomm et al., "Way forward on UL DCI-Triggered CSIRS resource set for tracking", 3GPP TSG RAN WG1 Meeting #92, Athens, Greece, Feb. 26-Mar. 2, 2018, R1-1803434, 8 pages.
Huawei, HiSilicon, "Summary of remaining issued for CSI reporting", 3GPP TSG RAN WG1 Ad Hoc Meeting: Vancouver, Canada, Jan. 22-26, 2018, R1-1800095, 8 pages.
3rd Generation Partnership Project; Technical Specification Group Radio Access Network; NR; Radio Resource Control (RRC) protocol specification (Release 15), 3GPP TS 38.331, V15.1.0, (Mar. 2018), 268 pages.
3rd Generation Partnership Project; Technical Specification Group Radio Access Network; NR; Physical layer procedures for data (Release 15), 3GPP TS 38.214 V15.0.0 (Dec. 2017), 71 pages.
Japanese Office Action for JP Application No. 2020-553467 dated Dec. 14, 2021 with English Translation.
Chinese Office Action for CN Application No. 201880091739.4 dated Nov. 30, 2022 with English Translation.
Nokia et al., "Summary of QCL", 3GPP TSG RAN WG1#92, Athens, Greece, Feb. 26-Mar. 2, 2018, R1-1803328 (32 pages).
Chinese Office Action dated Apr. 27, 2023 in Application No. 201880091739.4.
JP Office Action for JP Application No. 2022-125977, dated Oct. 3, 2023 with English Translation.
Ericsson, "CSI framework simplification", 3GPP TSG RAN WG1 Mee ting #92 R1-1803255, Feb. 28, 2018, pp. 1-pp. 10.
Huawei, HiSilicon, "TP on BWP switching and cross carrier scheduling with different numerology", 3GPP TSG RAN WG1 Meeting #92 R1-1802701, Feb. 17, 2018, pp. 1-pp. 2.
Qualcomm Incorporated, "Remaining Issues on BWP", 3GPP TSG RAN WG1 Meeting #92 R1-1802844, Feb. 17, 2018, pp. 1-pp. 24.
MediaTek Inc., "Summary for TRS part 2", 3GPP TSG RAN WG1 Meeting NR Ad Hoc R1-1801241, Jan. 29, 2018, pp. 1-pp. 14.
Nokia, Nokia Shanghai Bell, "Remaining Details of TRS Design", 3GPP TSG RAN WG1 Meeting #92 R1-1802563, Feb. 16, 2018, pp. 1-pp. 10.

METHODS AND APPARATUSES FOR REFERENCE SIGNAL CONFIGURATION

CROSS REFERENCE TO RELATED APPLICATIONS

This application is a Continuation of U.S. application Ser. No. 17/186,065, filed Feb. 26, 2021, which is a Continuation of U.S. patent application Ser. No. 17/037,208, filed on Sep. 29, 2020, now U.S. Pat. No. 11,070,337, which is a Continuation of International Application No. PCT/CN2018/081625, filed on Apr. 2, 2018, the contents of all of which are incorporated herein by reference in their entirety.

TECHNICAL FIELD

Embodiments of the present disclosure generally relate to the field of telecommunication, and in particular, to methods and apparatuses for reference signal configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal (RS) transmission, and so on, are studied for new radio access (NR).

In NR, it has been agreed that Channel State Information-Reference Signal (CSI-RS) can be used for different purposes, such as, for Channel State Information (CSI) acquisition, for beam management, for fine time-frequency tracking, for mobility, and so on. For example, CSI-RS for time-frequency tracking is also referred to as "Tracking Reference Signal (TRS)". CSI-RS can be divided into different types according to its behavior in time domain, such as periodic CSI-RS (P-CSI-RS), aperiodic CSI-RS (A-CSI-RS) and semi-persistent CSI-RS (SP-CSI-RS). In current spec, only P-CSI-RS can be used for time-frequency tracking. That is, only periodic TRS can be supported at present.

It is desirable to enable aperiodic TRS for accelerating secondary cell activation. However, the detailed solution for non-periodic TRS has not been provided yet.

SUMMARY

In general, example embodiments of the present disclosure provide methods and apparatuses for RS configuration.

In a first aspect, there is provided a method implemented in a network device. According to the method, the network device determines at least one set of CSI-RS resources for transmitting TRS to a terminal device. The network device further determines a first offset between a first slot to transmit a first signal for enabling transmission of the TRS and a second slot to transmit the TRS in the at least one set of CSI-RS resources. The first offset is different from a second offset between a third slot to transmit a second signal for enabling transmission of CSI-RS and a fourth slot to transmit the CSI-RS. The network device transmits a configuration indicating the at least one set of CSI-RS resources and the first offset to the terminal device.

In a second aspect, there is provided a method implemented in a terminal device. According to the method, the terminal device receives, from a network device, a configuration that indicates at least one set of CSI-RS resources for receiving TRS from the network device and a first offset between a first slot to receive a first signal for enabling transmission of the TRS and a second slot to receive the TRS in the at least one set of CSI-RS resources. The first offset is different from a second offset between a third slot to receive a second signal for enabling transmission of CSI-RS and a fourth slot to receive the CSI-RS. The terminal device determines, based on the configuration, the at least one of CSI-RS resources and the first offset.

In a third aspect, there is provided a network device. The network device comprises a processor and a memory coupled to the processor. The memory stores instructions that when executed by the processor, cause the network device to perform actions. The actions include: determining at least one set of CSI-RS resources for transmitting TRS to a terminal device; determining a first offset between a first slot to transmit a first signal for enabling transmission of the TRS and a second slot to transmit the TRS in the at least one set of CSI-RS resources, the first offset being different from a second offset between a third slot to transmit a second signal for enabling transmission of CSI-RS and a fourth slot to transmit the CSI-RS; and transmitting, to the terminal device, a configuration indicating the at least one set of CSI-RS resources and the first offset.

In a fourth aspect, there is provided a terminal device. The terminal device comprises a processor and a memory coupled to the processor. The memory stores instructions that when executed by the processor, cause the terminal device to perform actions. The actions include: receiving, from a network device, a configuration that indicates at least one set of CSI-RS resources for receiving TRS from the network device and a first offset between a first slot to receive a first signal for enabling transmission of the TRS and a second slot to receive the TRS in the at least one set of CSI-RS resources, the first offset being different from a second offset between a third slot to receive a second signal for enabling transmission of CSI-RS and a fourth slot to receive the CSI-RS; and determining, based on the configuration, the at least one set of CSI-RS resources and the first offset.

In a fifth aspect, there is provided a computer readable medium having instructions stored thereon. The instructions, when executed on at least one processor, cause the at least one processor to carry out the method according to the first aspect of the present disclosure.

In a sixth aspect, there is provided a computer readable medium having instructions stored thereon. The instructions, when executed on at least one processor, cause the at least one processor to carry out the method according to the second aspect of the present disclosure.

In a seventh aspect, there is provided a computer program product that is tangibly stored on a computer readable storage medium. The computer program product includes instructions which, when executed on at least one processor, cause the at least one processor to carry out the method according to the first aspect or the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
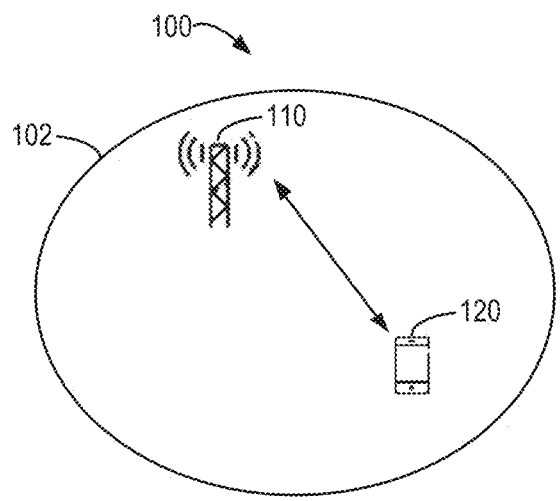
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 shows an example communication network 100 in which implementations of the present disclosure can be implemented. The network 100 includes a network device 110 and a terminal device 120 served by the network device 110. The network 100 can provide at least one serving cell 102 to serve the terminal device 120. It is to be understood that the number of network devices, terminal devices and/or serving cells is only for the purpose of illustration without suggesting any limitations. The network 100 may include any suitable number of network devices, terminal devices and/or serving cells adapted for implementing implementations of the present disclosure.

For example, in some scenarios, carrier aggregation (CA) can be supported in the network 100, in which two or more component carriers (CCs) are aggregated in order to support a broader bandwidth. In CA, the network device 110 may provide a plurality of serving cells (for example, one for each of the CCs) including one primary cell (PCell) and at least one secondary cell (SCell) to serve the terminal device 120. The terminal device 120 can establish Radio Resource Control (RRC) connection with the network device 110 in the PCell. The SCell can provide additional radio resources once the RRC connection between the network device 110 and the terminal device 120 is established and the SCell is activated via higher layer signaling.

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS to the terminal device 120 in a downlink. Similarly, the terminal device 120 may transmit a RS to the network device 110 in an uplink. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), CSI-RS, Sounding Reference Signal (SRS), Phase Tracking Reference Signal (PTRS) and so on. For the purpose of discussion without suggesting any limitations, in the following description, some embodiments will be described with reference to CSI-RS as examples of the RS. Prior to transmission of CSI-RS, the network device 110 may allocate corresponding resources (also referred to as "CSI-RS resources") for the transmission. As used herein, a CSI-RS resource refers to one or more resource elements (REs) allocated for CSI-RS transmission in time, frequency, and/or code domains.

In NR, it has been agreed that CSI-RS can be used for different purposes, such as, for channel measurement (such as, CSI acquisition), for beam management, for fine time-frequency tracking, for mobility, and so on. CSI-RS can be divided into different types according to its behavior in time domain, such as periodic CSI-RS (P-CSI-RS), aperiodic CSI-RS (A-CSI-RS) and semi-persistent CSI-RS (SP-CSI-RS). As used herein, "P-CSI-RS" refers to the CSI-RS which is transmitted periodically in time domain. "SP-CSI-RS" is similar to P-CSI-RS except that the transmission of SP-CSI-RS can be activated by a signal and deactivated by another signal. "A-CSI-RS" refers to the CSI-RS whose transmission can be triggered by the network device via trigger signaling (such as, Downlink Control Information (DCI)).

Different time offsets associated with A-CSI-RS have been designed and agreed in 3GPP specification works. For example, it has been agreed that if UL assignment (for example, Physical Downlink Control Channel (PDCCH) carrying DCI) is transmitted in slot N, the A-CSI-RS will be transmitted in slot N+X. In some embodiments, the A-CSI-RS triggering offset X may be fixed to zero or configurable on basis of per CSI-RS resource set. The offset X may be measured in slots.

As described above, CSI-RS for time-frequency tracking is also referred to as "TRS". In current 3GPP specification works, only P-CSI-RS can be used for time-frequency tracking. That is, only periodic TRS can be supported at present. It is desirable to support aperiodic TRS for accelerating SCell activation. However, the detailed solution for non-periodic TRS has not been provided yet.

In order to solve the problems above and one or more of other potential problems, a solution for TRS configuration is provided in accordance with example embodiments of the present disclosure. With the solution, the transmission of aperiodic TRS can be supported for assisting SCell activation.

Principle and implementations of the present disclosure will be described in detail below with reference to FIG. 2, which shows a process 200 for TRS transmission according to some implementations of the present disclosure. For the purpose of discussion, the process 200 will be described with reference to FIG. 1. The process 200 may involve the network device 110 and the terminal device 120 in FIG. 1.

Figure 2:
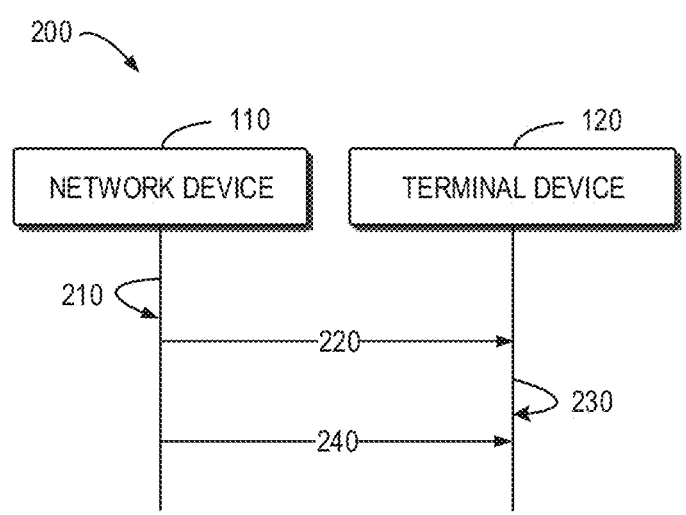
FIG. 2 shows a process for TRS transmission according to some implementations of the present disclosure.

As shown in FIG. 2, in some embodiments, the network device 110 determines (210) a configuration for transmitting TRS to the terminal device 120.

In some embodiments, the configuration determined by the network device 110 may indicate at least one set of CSI-RS resources for transmitting TRS to the terminal device 120. In the following, the "set of CSI-RS resources", "CSI-RS resource set" and "resource set" can be used interchangeably. In some embodiments, one CSI-RS resource set may include one or more CSI-RS resources.

In some embodiments, for different scenarios, the CSI-RS resources for TRS transmission may have different patterns. As used herein, the "pattern" of the CSI-RS resources may indicate a distribution of the CSI-RS resources in one or more slots in time domain. For example, in some embodiments, one CSI-RS resource set with two periodic CSI-RS resources in one slot can be determined for TRS transmission. This pattern is also referred to as "one slot pattern" herein. In some embodiments, one CSI-RS resource set with four periodic CSI-RS resources in two consecutive slots can be determined for TRS transmission. Alternatively, in some embodiments, two CSI-RS resource sets each with two periodic CSI-RS resources in one slot can be determined for TRS transmission. Both of the above two patterns are also referred to as "two slot pattern" herein.

In some embodiments, the at least one CSI-RS resource set may be configured with higher layer parameter TRS-Info to indicate that the at least one CSI-RS resource set can be used for TRS transmission. In case that a CSI-RS resource set is configured with higher layer parameter TRS-Info, it can be assumed that the antenna port with the same port index of the configured CSI-RS resources in the CSI-RS resource set is same.

In some embodiments, the configuration determined by the network device 110 for TRS transmission may also indicate periodicity and/or a slot offset for the TRS.

In some embodiments, the TRS to be transmitted from the network device 110 to the terminal device 120 may be aperiodic TRS (A-TRS). That is, the transmission of the TRS can be triggered by the network device 110 via trigger signaling, such as, PDCCH carrying DCI.

Figure 3:
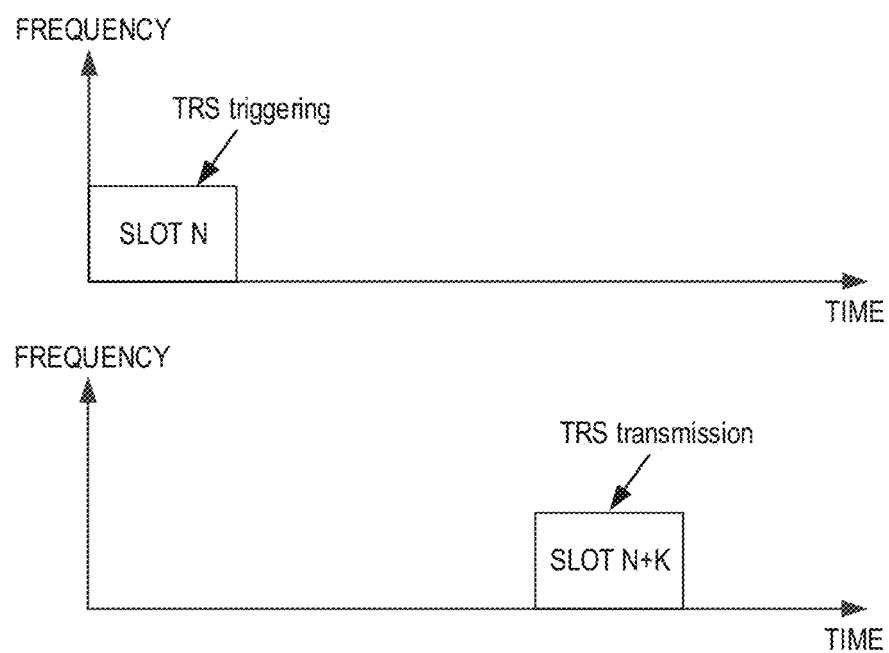
FIG. 3 shows an example of TRS transmission according to some embodiments of the present disclosure.

FIG. 3 shows an example of such embodiments. As shown in FIG. 3, the trigger signaling is transmitted in slot N, while the TRS is transmitted in slot N+K. In some embodiments, the configuration determined by the network device 110 for TRS transmission may indicate the slot offset (such as, K) between a first slot (such as, slot N) to transmit the trigger signaling for enabling the transmission of the TRS and a second slot (such as, slot N+K) to transmit the TRS in the at least one CSI-RS resource set.

In some embodiments, the slot offset for A-TRS used for time-frequency tracking may be different from the slot offset for ordinary A-CSI-RS used for other purposes. In some embodiments, A-TRS and A-CSI-RS may be associated with different parameters. For example, Quasi-Co-Location (QCL) parameters configured for A-TRS may be different from those configured for ordinary A-CSI-RS. As such, the slot offsets for A-PTS and A-CSI-RS may be different.

In some embodiments, a predefined set of candidate offsets $S_1$ may be configured for A-TRS. In this case, the network device 110 may select the slot offset for A-TRS from the predefined set $S_1$. In some embodiments, another set of candidate offsets $S_2$ may be configured for A-CSI-RS. In some embodiments, the set of candidate offsets $S_1$ for A-TRS may at least in part differ from the set of candidate offsets $S_2$ for A-CSI-RS. For example, if a CSI-RS resource set is configured with higher layer parameter TRS-Info, the slot offset associated with the CSI-RS resource set may be determined from the set of candidate offsets $S_1$. If the CSI-RS resource set is not configured with higher layer parameter TRS-Info, the slot offset associated with the CSI-RS resource set may be determined from the set of candidate offsets $S_2$. In some embodiments, the value of the slot offset for A-TRS cannot be 0. Alternatively, or in addition, in some embodiments, the slot offset for A-TRS may exceed a predetermined threshold, such as X slots or Y us. That is because if the TRS is trigged for other CC than the primary CC, the terminal device may need a Radio Frequency (RF) returning. Therefore, the slot offset needs to exceed a certain value.

In some embodiments, there may be a set of candidate slot offset values configured for aperiodic RS. For example, the slot offset may be the offset between the transmission of triggering information (for example, PDCCH or DMRS of PDCCH) of aperiodic RS and the transmission of the aperiodic RS in terms of slot. In some embodiments, the aperiodic RS may be at least one of CSI-RS, TRS, SRS, DMRS, PTRS, and positioning RS (PRS). In some embodiments, for different configurations of the RS (such as, RS resource, RS resource set, CSI report setting and/or Transmission Configuration Indicator (TCI) state), at least one value in the set of candidate slot offset values may be different. In some embodiments, for different configurations of the RS (such as, RS resource, RS resource set, CSI report setting and/or Transmission Configuration Indicator (TCI) state), the number of values in the set of candidate slot offset values may be different. In some embodiments, for different configurations of the RS (such as, RS resource, RS resource set, CSI report setting and/or Transmission Configuration Indicator (TCI) state), the minimum value in the set of candidate slot offset values may be different. In some embodiments, the configuration of the RS may include at least one of RS functionality, CSI report quantity, TRS-Info, value of TCI state, QCL type, and QCL referred RS. In some embodiments, for a first configuration of the RS, the set of candidate slot offset values may be represented as $S_1$, (for example, $S_1=\{S_{1\_1}, S_{1\_2}, S_{1\_3}, \ldots S_{1\_N}\}$, where N is the number of values in $S_1$) and for a second configuration of the RS, the set of candidate slot offset values may be represented as $S_2$, (for example, $S_2$ may be $\{S_{2\_1}, S_{2\_2}, S_{2\_3}, \ldots S_{2\_M}\}$, where M is the number of values in $S_2$). In some embodiments, the first configuration may indicate that the higher layer parameter TRS-Info is set to be TRUE or 1, which means, for example, the RS may be used for time-frequency tracking. The second configuration may indicate that the higher layer parameter TRS-Info is set to be False or 0, which means, for example, the RS may not be used for time-frequency tracking. In some embodiments, the first configuration may indicate that the QCL referred RS and/or QCL type for the transmission of RS triggering information (for example, PDCCH or DMRS of PDCCH) is different from that for RS transmission. The second configuration may indicate that the QCL referred RS and/or QCL type for the transmission of RS triggering information (for example, PDCCH or DMRS of PDCCH) is the same as that for the transmission of the RS. In some embodiments, the first configuration may indicate the cell, Bandwidth part (BWP), frequency range and/or CC for the transmission of RS triggering information. The second configuration may indicate the cell, BWP, frequency range and/or CC for RS transmission. The first configuration may be different from the second configuration. In some embodiments, if the first and second configurations are different, at least one value in $S_1$ may not be included in $S_2$. In some embodiments, if the first and second configurations are different, the number of values in $S_1$ may be different from the number of values in $S_2$, that is N≠M. In some embodiments, if the first and second configurations are different, the minimum value in $S_1$ may be different from the minimum value in $S_2$. In some embodiments, for the first configuration, there may be no value 0 in $S_1$, or all of the values in $S_1$ may not be less than a predetermined positive value, such as X slots or Y us.

In some embodiments, the slot offset for A-TRS can be determined on basis of per CSI-RS resource set. Specifically, in some embodiments, the slot offset may be determined based on the pattern of the at least one CSI-RS resource set. In some embodiments, for one slot pattern, one CSI-RS resource set with two periodic CSI-RS resources in one slot may be configured for TRS transmission. In this case, the slot offset can be determined on basis of the one CSI-RS resource set. That is, the offset indicates the number of slots between the slot containing the DCI that triggers the transmission of the TRS and the slot in which TRS is transmitted in the one CSI-RS resource set.

In some embodiments, for two slot pattern, one CSI-RS resource set with four periodic CSI-RS resources in two consecutive slots may be determined for TRS transmission. In this case, the slot offset for A-TRS can be determined on basis of the previous one of the two consecutive slots. That is, the offset indicates the number of slots between the slot containing the DCI that triggers the transmission of the TRS and the slot in which TRS is transmitted in the two periodic CSI-RS resources in the previous one of the two consecutive slots.

In some embodiments, for two slot pattern, two CSI-RS resource sets each with two periodic CSI-RS resources in one slot may be configured for TRS transmission. In this case, one DCI can trigger both of the two CSI-RS resource sets. The slot offset for A-TRS can be determined on basis of at least one of the two CSI-RS resource sets. For example, assume that the slot offset determined for one of the two CSI-RS resource sets is m and the slot offset determined for the other of the two CSI-RS resource sets is p. In some embodiments, p=m+1. In some other embodiments, p=m−1. In some embodiments, if two CSI-RS resource sets are triggered in a single DCI or in a single slot, the two CSI-RS resource sets may be regarded as one TRS resource set. Alternatively, or in addition, in this case it can be assumed that the antenna port with the same port index of the configured CSI-RS resources in the two CSI-RS resource sets is same. In some embodiments, there may be one additional parameter or indicator in the two CSI-RS resource sets to indicate whether the two CSI-RS resource sets can be used as one TRS resource set, or whether it can be assumed that the antenna port with the same port index of the configured CSI-RS resources in the two CSI-RS resource sets is same or not. In some embodiments, the additional parameter or indicator may be represented as "TRS-single". It is to be understood that other representation can also be used. In some embodiments, if the TRS-single is set to be a predetermined value or state A, the two CSI-RS resource sets may not be regarded as one TRS set or it cannot be assumed that the antenna port with the same port index of the configured CSI-RS resources in the two CSI-RS resource sets is same. If the TRS-single is set to another predetermined value or state B, which is different from A, the two CSI-RS resource sets may be regarded as one TRS set or it can be assumed that the antenna port with the same port index of the configured CSI-RS resources in the two CSI-RS resource sets is same. In some embodiments, the additional parameter or indicator may be configured for each CSI-RS resource set or each of the CSI-RS resource sets triggered by the same DCI or same slot. In some embodiments, the additional parameter or indicator may be configured for the two CSI-RS resource sets triggered by the DCI.

In some embodiments, the TRS to be transmitted from the network device 110 to the terminal device 120 may be semi-persistent TRS (SP-TRS). That is, once the transmission of the SP-TRS is activated by the network device 110 via first signaling (such as, PDCCH or Media Access Control (MAC) Control Element (CE)), the SP-TRS can be transmitted periodically like periodic TRS (P-TRS). In some embodiments, the transmission of the SP-TRS can be deactivated by the network device 110 via second signaling (such as, PDCCH or MAC CE). In some embodiments, the transmission of the SP-TRS may be implicitly deactivated in case of at least one of the following: the terminal device receives the RRC signaling; the terminal device reports the acknowledgement (ACK) for the RRC signaling for P-TRS transmission; the terminal device reports a valid Channel quality indicator (CQI); or the terminal device successfully decode the PDCCH or some other channel on the same BWP, cell, CC, frequency range, SCell, PCell and/or primary SCell.

In some embodiments, for SP-TRS, the periodicity and the slot offset can the same as those configured for P-TRS, respectively. Specifically, the slot offset for SP-TRS can be on a basis of per CSI-RS resource.

In some embodiments, the slot offset (such as, Q) for SP-TRS may indicate the number of slots between the slot (such as, slot M) containing the first signaling (such as, PDCCH or MAC CE) that activates the transmission of the SP-TRS and the slot (such as, slot M+Q) from which the effective transmission of SP-TRS begins.

In some embodiments, the slot offset Q for SP-TRS can be fixed to be a predetermined value. In some embodiments, the slot offset Q for SP-TRS may be fixed to be an absolute time interval, for example, K microseconds. In some embodiments, the actual value of the slot offset Q may be calculated based on the time interval K and the value of subcarrier spacing (SCS) $S_c$ for the SP-TRS. For example, the value of the slot offset Q can be determined by rounding up or down the number of slots within the time interval K. For example, the value of K cannot be 0.

In some embodiments, the slot offset Q for SP-TRS can be determined based on the value of subcarrier spacing (SCS) for the SP-TRS. For example, for a given value of SCS, the slot offset K for SP-TRS can be fixed.

In some embodiments, the slot offset Q for SP-TRS can be configurable and may be determined from a set of candidate offsets predefined for SP-TRS. In some embodiments, if the configuration (such as, QCL type, QCL referred RS, the cell, the BWP, the frequency range and/or the CC) for the transmission of the first signaling (such as, PDCCH or MAC CE) is the same that for SP-TRS transmission, the value of the slot offset Q for SP-TRS may be $q_1$. If the configuration (such as, QCL type, QCL referred RS, the cell, the BWP, the frequency range and/or the CC) for the transmission of the first signaling (such as, PDCCH or MAC CE) is different from that for SP-TRS transmission, the value of the slot offset Q for SP-TRS may be $q_2$, where $q_1 \neq q_2$. For example, the set of candidate offsets predefined for SP-TRS may not include the value '0'.

In some embodiments, there may be respective P-TRS configuration for TRS transmission in SCell, Pcell or PSCell. For example, a TRS configuration may indicate at least one of the following: the frequency resource within one slot, the time resource within one slot, the symbol index, the periodicity, the slot offset, and so on. In some embodiments, the frequency resource within one slot, the time resource within one slot, the symbol index, the periodicity and/or the slot offset configured for activated SP-TRS may be the same as that configured for P-TRS. In some embodiments, there may be additional configurations on the periodicity and/or slot offset for SP-TRS. For example, in addition to sharing some configurations with P-TRS, it may only be necessary to additionally configure the periodicity and/or slot offset for SP-TRS. In some embodiments, the periodicity for SP-TRS transmission may be the same as that configured for P-TRS.

In addition, the actual index of the slot for transmitting SP-TRS may be determined based on the index of the slot containing the first signaling (such as, PDCCH or MAC CE) for SP-TRS activation and the slot offset Q for SP-TRS.

In some cases, the activated SP-TRS may have a different SCS from the trigger signaling (such as, PDCCH or MAC CE). For example, the SCS for the activated SP-TRS may be SCS1, and the SCS for the activating PDCCH or MAC CE is SCS2, where SCS1≠SCS2. In some embodiments, in this case, the slot offset Q for SP-TRS may be determined based on the SCS for the activated SP-TRS, that is, SCS1.

Returning to FIG. 2, the network device 110 transmits (220) the configuration for TRS transmission to the terminal device 120. For example, the configuration for TRS transmission may indicate the at least one CSI-RS resource set configured with the parameter TRS-Info, the slot offset between the first slot to transmit the trigger and/or activation signaling for enabling the transmission of the TRS and the second slot to transmit the TRS in the at least one CSI-RS resource set, and so on.

As shown in FIG. 2, in response to receiving the configuration for TRS transmission from the network device 110, the terminal device 120 may determine (230) the at least one CSI-RS resource set and the slot offset for TRS transmission based on the configuration.

The network device 110 then transmits (240) the trigger signaling and the TRS to the terminal device 120 at least based on the configuration. Specifically, the network device 110 may transmit the trigger and/or activation signaling in the first slot and transmits the TRS with the at least one CSI-RS resource set in the second slot to the terminal device 120. The terminal device 120 may receive the trigger and/or activation signaling and the TRS from the network device 110 at least based on the received configuration. Specifically, the terminal device 120 may receive the trigger and/or activation signaling in the first slot and transmits the TRS with the at least one CSI-RS resource set in the second slot from the network device 110.

In NR, multi-TRP transmission can be supported. In order to perform multi-TRP CSI measurement, a solution for multi-TRP CSI measurement is provided in accordance with example embodiments of the present disclosure.

Figure 4:
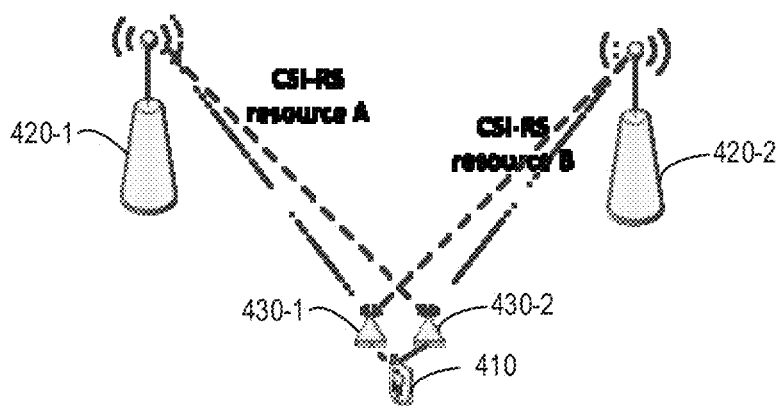
FIG. 4 shows an example of multi-TRP CSI measurement in accordance with some embodiments of the present disclosure.

FIG. 4 shows an example of multi-TRP CSI measurement in accordance with some embodiments of the present disclosure. As shown in FIG. 4, a terminal device 410 can be served by two TRPs 420-1 and 420-2. It is to be understood that the number of terminal devices and/or TRPs is only for the purpose of illustration without suggesting any limitations.

In some embodiments, the terminal device 410 may support simultaneous reception from different TRPs. For example, as shown in FIG. 4, the terminal device 410 may support two spatial Rx beams 430-1 and 430-2. In some embodiments, a pair of CSI-RS resources A and B can be configured for CSI-RS transmission from the TRPs 420-1 and 420-2. As shown in FIG. 4, the terminal device 410 can receive, via the Rx beam 430-1 and from the TRP 420-1, CSI-RS transmitted in the CSI-RS resource A. Meanwhile, the terminal device 410 can receive, via the Rx beam 430-2 and from the TRP 420-1, CSI-RS transmitted in the CSI-RS resource B. In addition, the terminal device 410 can detect, via the Rx beam 430-1 and in the CSI-RS resource A, interference from the TRP 420-2. Meanwhile, the terminal device 410 can detect, via the Rx beam 430-2 and in the CSI-RS resource B, interference from the TRP 420-1. That is, for the Rx beam 430-1, the CSI-RS resource A can be used for channel measurement and the CSI-RS resource B can be used for interference measurement. In some embodiments, for the Rx beam 430-1, Quasi-Co-Location (QCL) parameters and/or receiving beam of the CSI-RS resource B for interference measurement may follow those of the CSI-RS resource A for channel measurement. Similarly, for the Rx beam 430-2, the CSI-RS resource B can be used for channel measurement and the CSI-RS resource A can be used for interference measurement. In some embodiments, for the Rx beam 430-2, the QCL parameters and/or receiving beam of the CSI-RS resource A for interference measurement may follow those of the CSI-RS resource B for channel measurement. In this way, multi-TRP CSI measurement can be implemented.

In some embodiments, a pair of CSI-RS resources (such as, the CSI-RS resource A with QCL parameter QCL-1 and the CSI-RS resource B with QCL parameter QCL-2) can be configured for the terminal device, and a pair of measurements may be performed by the terminal device. For example, the terminal device may measure the channel on the CSI-RS resource A and measure the interference on the CSI-RS resource B with QCL-1. Likewise, the terminal device may measure the channel on the CSI-RS resource B and measure the interference on the CSI-RS resource A with QCL-2. In some embodiments, there may be an additional parameter and/or indicator to configure the terminal device for the pair of measurements. In some embodiments, the terminal device may perform the pair of measurements if configured with group-based reporting.

Figure 5:
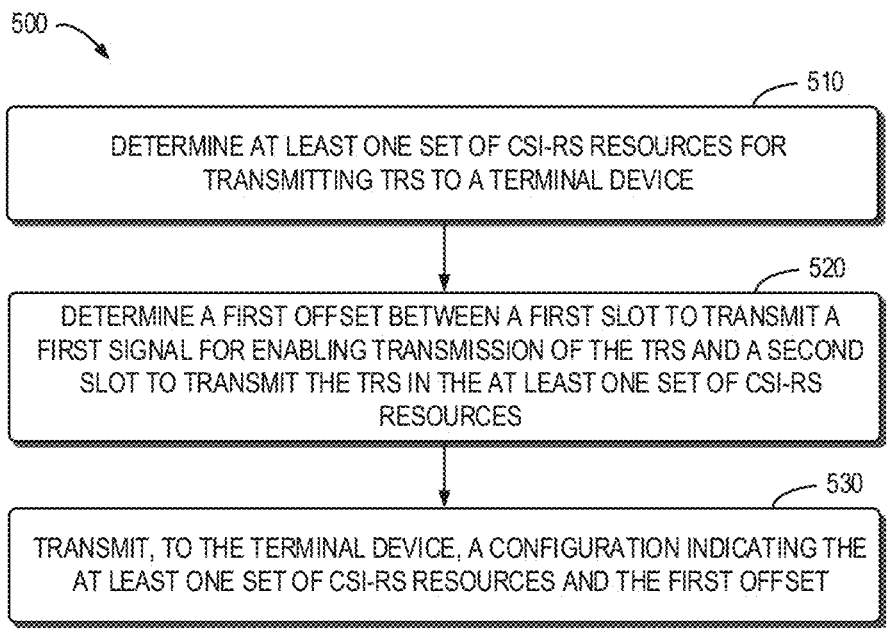
FIG. 5 shows a flowchart of an example method for TRS configuration according to some embodiments of the present disclosure.

FIG. 5 shows a flowchart of an example method 500 in accordance with some embodiments of the present disclosure. The method 500 can be implemented at the network device 110 as shown in FIG. 1. For the purpose of discussion, the method 500 will be described from the perspective of the network device 110 with reference to FIG. 1.

At block 510, the network device 110 determines at least one set of Channel State Information-Reference Signal (CSI-RS) resources for transmitting Tracking Reference Signal (TRS) to the terminal device 120.

At block 520, the network device 110 determines a first offset between a first slot to transmit a first signal for enabling transmission of the TRS and a second slot to transmit the TRS in the at least one set of CSI-RS resources.

At block 530, the network device 110 transmits, to the terminal device 120, a configuration indicating the at least one set of CSI-RS resources and the first offset.

In some embodiments, the first offset is different from a second offset between a third slot to transmit a second signal for enabling transmission of CSI-RS and a fourth slot to transmit the CSI-RS. For example, the TRS and the CSI-RS may be associated with different Quasi-Co-Location (QCL) parameters.

In some embodiments, the network device 110 may determine the at least one set of CSI-RS resources by determining a distribution of the at least one set of CSI-RS resources in one or more slots. The network device 110 may determine the first offset based on the distribution.

In some embodiments, the distribution may indicate that the at least one set of CSI-RS resources includes a first resource set with two periodic CSI-RS resources in one slot. The network device 110 may determine the first offset based on the first resource set.

In some embodiments, the distribution may indicate that the at least one set of CSI-RS resources includes a second resource set with four periodic CSI-RS resources in two consecutive slots. The network device 110 may determine the first offset based on at least one of the two consecutive slots.

In some embodiments, the distribution may indicate that the at least one set of CSI-RS resources includes two resource sets each with two periodic CSI-RS resources in one slot. The network device 110 may obtain a first set of candidate offsets predefined for the TRS, and determine the first offset from the first set of candidate offsets. In some embodiments, the first set of candidate offsets may be at least in part different from a second set of candidate offsets predefined for the CSI-RS and the second offset may be determined from the second set of candidate offsets.

In some embodiments, the TRS is aperiodic.

In some embodiments, the TRS is semi-persistent. The network device 110 may obtain a third offset preconfigured for periodic TRS, and determine the first offset based on the third offset.

In some embodiments, the TRS may be associated with a first subcarrier spacing (SCS) and the first signal may be associated with a second SCS that is different from the first SCS. The network device 110 may determine the first offset at least based on the first SCS.

In some embodiments, the network device 110 may transmit, at least based on the configuration, the first signal and the TRS to the terminal device.

Figure 6:
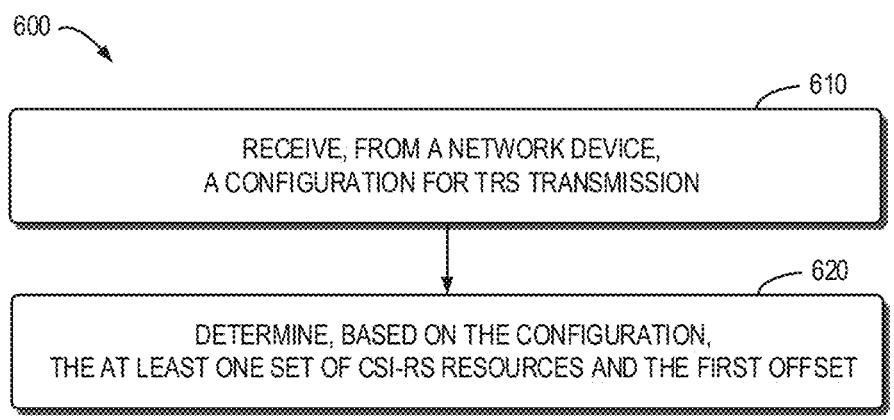
FIG. 6 shows a flowchart of an example method for TRS configuration according to some embodiments of the present disclosure.

FIG. 6 shows a flowchart of an example method 600 in accordance with some embodiments of the present disclosure. The method 600 can be implemented at the terminal device 120 as shown in FIG. 1. For the purpose of discussion, the method 500 will be described from the perspective of the terminal device 120 with reference to FIG. 1.

At block 610, the terminal device 120 receives, from the network device 110, a configuration for TRS transmission. The configuration may indicate at least one set of CSI-RS resources for receiving TRS from the network device 110 and a first offset between a first slot to receive a first signal for enabling transmission of the TRS and a second slot to receive the TRS in the at least one set of CSI-RS resources.

At block 620, the terminal device 120 determines, based on the configuration, the at least one set of CSI-RS resources and the first offset.

In some embodiments, the first offset is different from a second offset between a third slot to transmit a second signal for enabling transmission of CSI-RS and a fourth slot to transmit the CSI-RS. For example, the TRS and the CSI-RS may be associated with different Quasi-Co-Location (QCL) parameters.

In some embodiments, the TRS is aperiodic.

In some embodiments, the TRS is semi-persistent.

In some embodiments, the TRS may be associated with a first subcarrier spacing (SCS) and the first signal may be associated with a second SCS that is different from the first SCS. The terminal device 120 may determine the first offset at least based on the first SCS.

In some embodiments, the terminal device 120 may receive, at least based on the configuration, the first signal and the TRS from the network device 110.

Figure 7:
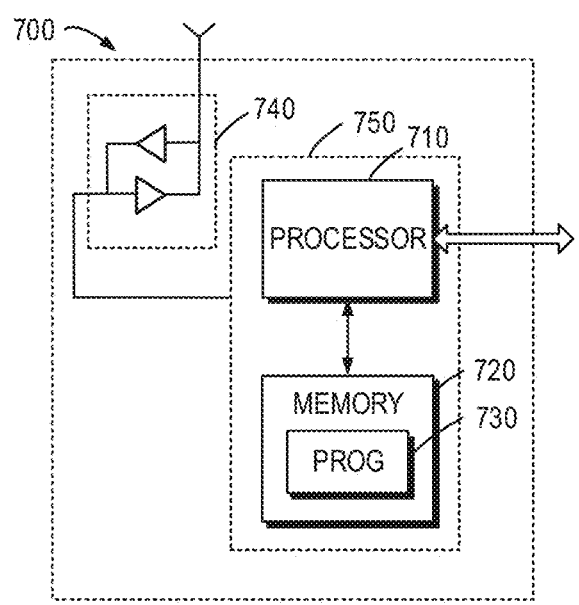
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 as shown in FIG. 1. Accordingly, the device 700 can be implemented at or as at least a part of the network device 110.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730.

The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 8. The embodiments herein may be implemented by computer software executable by the processor 610 of the device 700, or by hardware, or by a combination of software and hardware. The processor 610 may be configured to implement various embodiments of the present disclosure. Furthermore, a combination of the processor 610 and memory 610 may form processing means 750 adapted to implement various embodiments of the present disclosure.

The memory 610 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 610 is shown in the device 700, there may be several physically distinct memory modules in the device 700. The processor 610 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 7B. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a base station, the method comprising:
   transmitting, to a terminal device, first information indicating a first resource set for a Channel State Information Reference Signal (CSI-RS) for tracking, the first information comprising:
      a parameter trs-Info set to a value representing true; and
      a first parameter indicating a first time offset between
         a first slot containing a first signal that triggers a transmission of the CSI-RS for tracking and
         a second slot in which the CSI-RS for tracking is transmitted,
      wherein the first time offset is configured to satisfy a threshold condition required by the terminal device; and
   transmitting the CSI-RS for tracking to the terminal device in the second slot.

2. The method of claim 1, wherein:
   the first resource set is associated with a set of periodic CSI-RS resources configured with four periodic CSI-RS resources with two consecutive slots with two periodic CSI-RS resources in each slot, wherein the two consecutive slots are in an order of a third slot and a fourth slot in time domain, and
   the first time offset is for the third slot.

3. The method of claim 1, wherein the CSI-RS for tracking is aperiodic.

4. The method of claim 1, wherein the first signal is transmitted in a Downlink Control Information (DCI) format.

5. The method of claim 1, further comprising:
   determining the first time offset based on a first subcarrier spacing (SCS) associated with the CSI-RS for tracking.

6. The method of claim 5, wherein the first signal is associated with a second SCS that is different from the first SCS.

7. A method performed by a terminal device, the method comprising:
   receiving, from a base station, first information indicating a first resource set for a Channel State Information Reference Signal (CSI-RS) for tracking, the first information comprising:
      a parameter trs-Info set to a value representing true; and
      a first parameter indicating a first time offset between
         a first slot containing a first signal that triggers the CSI-RS for tracking and
         a second slot in which the CSI-RS for tracking is received,
      wherein the first time offset is configured to satisfy a threshold condition required by the terminal device; and
   receiving the CSI-RS for tracking from the base station in the second slot.

8. The method of claim 7, wherein:
   the first resource set is associated with a set of periodic CSI-RS resources configured with four periodic CSI-RS resources with two consecutive slots with two periodic CSI-RS resources in each slot, wherein the two consecutive slots are in an order of a third slot and a fourth slot in time domain, and
   the first time offset is for the third slot.

9. The method of claim 7, wherein the CSI-RS for tracking is aperiodic.

10. The method of claim 7, wherein the first signal is received in a Downlink Control Information (DCI) format.

11. The method of claim 7, wherein the first time offset is based on a first subcarrier spacing (SCS) associated with the CSI-RS for tracking.

12. The method of claim 11, wherein the first signal is associated with a second SCS that is different from the first SCS.

13. A base station comprising:
   a transceiver; and a processor configured to control the transceiver to:
   transmit, to a terminal device, first information indicating a first resource set for a Channel State Information Reference Signal (CSI-RS) for tracking, the first information comprising:
      a parameter trs-Info set to a value representing true; and
      a first parameter indicating a first time offset between
         a first slot containing a first signal that triggers a transmission of the CSI-RS for tracking and
         a second slot in which the CSI-RS for tracking is transmitted,
      wherein the first time offset is configured to satisfy a threshold condition required by the terminal device; and
   transmit the CSI-RS for tracking to the terminal device in the second slot.

14. The base station of claim 13, wherein:
   the first resource set is associated with a set of periodic CSI-RS resources configured with four periodic CSI-RS resources with two consecutive slots with two periodic CSI-RS resources in each slot, wherein the two consecutive slots are in an order of a third slot and a fourth slot in time domain, and
   the first time offset is for the third slot.

15. The base station of claim 13, wherein the CSI-RS for tracking is aperiodic.

16. The base station of claim 13, wherein the first signal is transmitted in a Downlink Control Information (DCI) format.

17. The method of claim 13, further comprising a controller configured to determine the first time offset is based on a first subcarrier spacing (SCS) associated with the CSI-RS for tracking.

18. The method of claim 17, wherein the first signal is associated with a second SCS that is different from the first SCS.

* * * * *